J. R. OISHEI.
ADJUSTABLE SUPPORT OR BRACKET.
APPLICATION FILED JULY 27, 1920.

1,394,440.

Patented Oct. 18, 1921.

Inventor,
John R. Oishei
By Parker & Brockwow
Attorneys.

J. R. OISHEI.
ADJUSTABLE SUPPORT OR BRACKET.
APPLICATION FILED JULY 27, 1920.
1,394,440.
Patented Oct. 18, 1921.
2 SHEETS—SHEET 2.
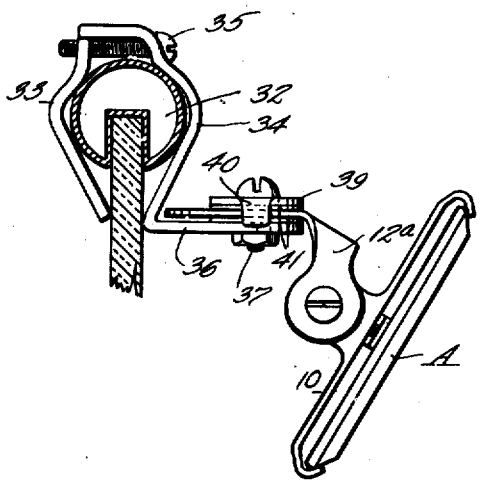
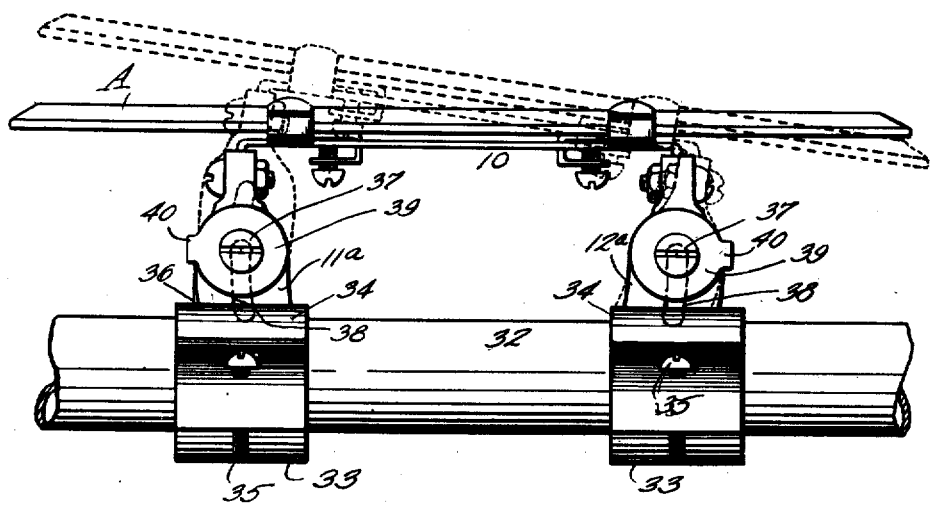

UNITED STATES PATENT OFFICE.

JOHN R. OISHEI, OF BUFFALO, NEW YORK.

ADJUSTABLE SUPPORT OR BRACKET.

1,394,440.

Specification of Letters Patent.

Patented Oct. 18, 1921.

Application filed July 27, 1920. Serial No. 399,226.

*To all whom it may concern:*

Be it known that I, JOHN R. OISHEI, citizen of the United States, residing at Buffalo, in the county of Erie and State of New York, have invented a new and useful Improvement in Adjustable Supports or Brackets, of which the following is a specification.

This invention relates to improvements in adjustable supports or brackets of the kind used for mounting mirrors on automobiles or vehicles in position to enable the driver to readily see objects in rear of him. These mirrors are located at the front portion of the vehicle, and in the case of closed vehicles it is desirable to position the mirror inside of the vehicle and so as to give a view through the rear window thereof. In order to locate the mirror so that it will not obstruct the driver's view through the front window and will be out of the way, it is preferably placed above or adjacent to the upper edge of the windshield or front window, where it will be also inconspicuous and not unsightly when seen through the front window. It is important for the mirror to be adjustable so that it can be set at the necessary angle horizontally and vertically, depending upon the location of the mirror in the vehicle and to suit the particular driver, in order to enable him to see the road or objects in the required rearward direction. The bracket or support for the mirror should be of a construction such that while permitting the above mentioned location and necessary adjustments of the mirror, it will be strong and stable and prevent vibration of the mirror so that the image reflected by the mirror will be as nearly motionless as possible.

The object of this invention is to provide a practical and desirable mirror support or bracket for the purpose stated, which is of simple, compact, stable and inexpensive construction and is adapted to accomplish the results above mentioned.

In the accompanying drawings:

Fig. 6 is an end elevation of a bracket of modified construction adapted to be removably clamped on the upper edge of a windshield or like support.

Fig. 7 is a plan view thereof, showing by full and broken lines different adjustments of the mirror.

Figures 1, 2:
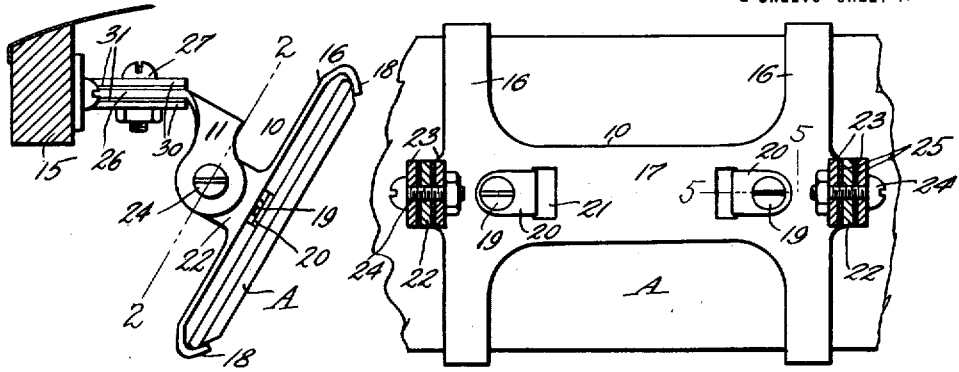
Figure 1 is an end elevation of a mirror support or bracket embodying the invention, showing the same mounted on the front bar of a vehicle top.
Fig. 2 is a sectional elevation thereof on line 2—2, Fig. 1, looking toward the back of the mirror.

Referring first to Figs. 1-5, A represents the mirror which may be of any suitable shape but which is preferably of relatively long, narrow shape and is provided with beveled edges.

The adjustable mirror support or bracket comprises an outer or holding member or means 10 on which the mirror is removably secured, arms or members 11 and 12, to which the holding means or member is pivotally connected, and attaching members or means 13 and 14 adapted to be fastened on the vehicle frame, or other suitable support 15, and to which the arms 11 and 12 are adjustably connected.

The mirror holding means 10 preferably consists of a single piece of sheet metal of substantially H-shape as shown, having parallel, upright legs 16, which are connected between their ends by a horizontal cross piece 17. The legs 16 are provided with bent or hook-shaped ends 18 adapted to extend around the upper and lower edges of the mirror and engage the beveled faces of the same. The mirror can be slipped endwise into place between the hooked ends 18 and secured therein by any suitable means. The means shown for this purpose consist of two screws 19 which pass through and turn in threaded holes in the holding member back of the mirror and are adapted when tightened to press the mirror outwardly against the hooked ends 18 of the holding member and thus firmly secure it in the holding member. In order to prevent the screws from contacting with and scratching or injuring the reflecting backing or coating of the mirror, bearing pieces 20 are provided having portions which extend between the ends of the screws and the back of the mirror. The bearing pieces shown are of U-shape and are held in place by passing through openings 21 in the holding member 10, and having in their inner ends holes through which the shanks of the screw pass loosely. The bearing pieces are thus retained loosely in place on the holding member and are adapted to be forced against the back of the mirror by tightening the screws. The ends of the screws bear and turn on the outer ends of the bearing pieces, which are pressed without turning against the back of the mirror and therefore will not injure the backing.

Figure 3:
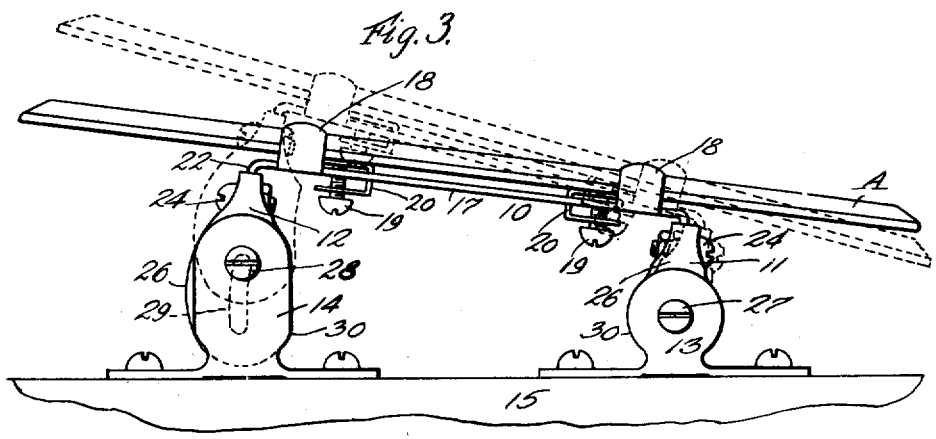
Fig. 3 is a plan view thereof showing by full and dotted lines different adjustments of the mirror.
Figures 4, 5:
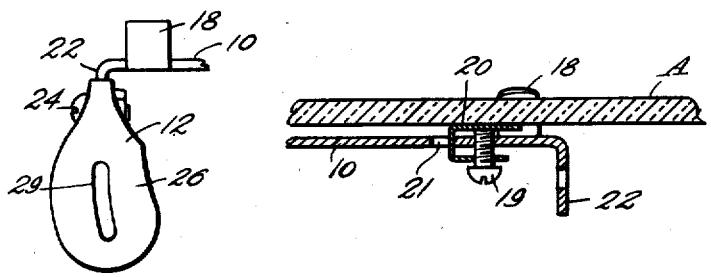
Fig. 4 is a plan view of the adjustable bracket arm, detached.
Fig. 5 is a sectional view on line 5—5, Fig. 2.

The adjustable arms or intermediate members 11 and 12 are pivotally connected to two perforated ears 22 which project rearwardly from the mirror holding member 10, preferably near its opposite ends. Each of the arms 11 and 12 preferably consists of a sheet metal stamping having spaced, depending lugs 23 which embrace one of the ears 22 on the holding member 10 and are pivotally secured thereto by a bolt or screw 24 passing through registering holes in the ear and lugs. Friction washers 25 of fiber or other suitable material are preferably placed between the lugs 23 and the opposite sides of the ear 22 so as to form a friction joint which will enable the mirror to be swung to different, angular positions but be held firmly by friction in the position to which it is adjusted. The forwardly projecting ends or portions 26 of the arms 11 and 12 lie substantially horizontally and are connected by screws or bolts 27 and 28 to the attaching means or member 13 and 14 of the bracket so as to permit horizontal adjustments of the arms 11 and 12 relatively to the attaching members to set the mirror either parallel with or obliquely to the support 15. In the construction shown in Figs. 1–5, the forward end of the arm 11 has a pivot hole through which the screw 27 for this arm passes so that the arm can turn horizontally on the screw as a pivot, while the forward end of the other arm 12 is provided with an elongated slot 29 for its screw 28, preferably concentric with the pivot 27 for the arm 11, so that the latter arm 12 is adapted to be adjusted forwardly or rearwardly on its attaching member as may be necessary to set the mirror in the desired relation to the support 15. As indicated in Fig. 3, the arm 12 can be adjusted forwardly or rearwardly on its attaching member to adjust the mirror to a greater or less angle to the supporting bar. The attaching members can be secured by screws or other suitable fastenings to the supporting bar 15. Each of the members 13 and 14 shown is provided with upper and lower, spaced lugs 30 between which the forward end of the related arm 11 or 12 is clamped, and friction washers 31 of fiber or other suitable material are preferably employed between the lugs 30 and the opposite faces of the interposed end of the arm so as to give the necessary friction to properly hold the arms in the position to which they are adjusted.

The bracket shown in Figs. 6 and 7 is similar to that above described except in the following particulars.

This bracket is intended for removably mounting the mirror on the upper edge or frame bar of a windshield or analogous support 32, and for this purpose the attaching members are in the form of clamps adapted to embrace and grip the frame bar 32. Each clamp shown comprises opposite jaws 33 and 34 connected by a clamp screw 35. One member 34 of each clamp is provided with a projecting, substantially horizontal lug or portion 36 to which the forward end of the related, adjustable arm 11$^a$ or 12$^a$ of the bracket is adjustably secured by a screw 37. In this construction each of the arms 11$^a$ and 12$^a$ is provided with an elongated slot 38, see Fig. 7, each slot being concentric with the screw for the other arm. In this way either of the arms 11$^a$ or 12$^a$ can be adjusted forwardly or rearwardly on its attaching clamp, as may be required to give any desired horizontal obliquity in either direction to the mirror. Since the clamp is not provided with spaced lugs between which the forward end of the adjustable arm is adapted to be clamped, but with only one projecting lug, a clamping washer 39 is preferably employed between the head of the screw 37 and the forward end of the adjustable arm and this washer is provided at one side with a bent lug 40 adapted to engage the edge of the adjustable arm, or with other means for preventing the washer from turning. Friction washers 41 are also preferably used in this construction as in the others, at opposite sides of the front end of the adjustable arm to give the necessary friction in the joint.

Both arms 11 and 12 in the first bracket described can be slotted, as in the case of the bracket shown in Figs. 6 and 7, if desired.

In both of the constructions described the mirror is supported by two adjustable arms located near the ends of the mirror, or at a considerable distance apart. The mirror is, therefore, held very rigidly or firmly and the vibration thereof prevented. Nevertheless, the brackets or supports constructed as described enable both the vertical and horizontal adjustments necessary to set the mirror in different, required positions.

I claim as my invention:—

1. An adjustable supporting device for mirrors and the like comprising holding means to which the mirror is secured, a pair of arms to which said holding means is pivoted at separated points to permit the mirror to swing in one plane, a pair of attaching members adapted to be secured to a support, and a pivotal connection between each of said arms and its related attaching member, one of said arms having a slot through which the pivot passes and which is arranged to permit an adjustment of said arm toward and from said support.

2. An adjustable supporting device for mirrors and the like comprising holding means to which the mirror is secured, a pair of arms to which said holding means is pivoted at separated points to permit the mirror to swing in one plane, attaching means adapted to be secured to a support, and separate pivotal connections between said arms and said attaching means arranged with their axes at an angle to the axes of the pivots connecting the arms to said holding means, one of said arms having a slot through which said pivot extends and which is arranged to permit an adjustment of said arm toward and from said support.

3. An adjustable supporting device for mirrors and the like comprising a holding member constructed to be secured to the mirror and having a pair of separated pivot bars extending substantially perpendicular to the mirror, a pair of arms pivotally connected to said lugs to permit the mirror to swing in a plane at an angle to the plane of the mirror, attaching means adapted to be secured to a support, a pivotal connection between one of said arms and said attaching means, and a pin and slot connection between said other arm and said attaching means permitting an adjustment of the last mentioned arm in a direction around the pivotal connection between said first arm and the attaching means.

4. An adjustable supporting device for mirrors and the like comprising a holding member constructed to be secured to the mirror and having a pair of separated pivot lugs extending substantially perpendicular to the mirror, a pair of arms pivotally connected to said lugs to permit the mirror to swing in a plane at an angle to the plane of the mirror, a pair of attaching members adapted to be secured to a support, a pivot connecting one of said arms to one of said attaching members, and a pivot connecting the other arm to said other attaching member and extending through an elongated slot in said arm.

5. An adjustable supporting device for mirrors and the like comprising a holding member constructed to be secured to the mirror and having a pair of separated pivot lugs extending substantially perpendicular to the mirror, a pair of arms pivotally connected to said lugs to permit the mirror to swing in a plane at an angle to the plane of the mirror, a pair of attaching members adapted to be secured to a support, said arms having elongated slots extending lengthwise thereof, and fastening devices connecting said arms to said attaching members and passing through said slots.

6. A supporting device for mirrors and the like comprising means for attaching said device to a support, a holding member provided with bent ends which engage the edges of the mirror, a securing device movable toward and back of the mirror for forcing the mirror against said ends of the holding member, and a bearing piece which extends between said securing device and the mirror back and is loosely retained in a hole in said holding member.

7. A supporting device for mirrors and the like comprising means for attaching said device to a support, a holding member provided with bent ends which engage the edges of the mirror, a securing device movable toward the back of the mirror for forcing the mirror against said ends of the holding member, and a U-shaped bearing piece which extends through a hole in said holding member and has one leg thereof arranged between said securing device and the back of the mirror, and a hole in its other leg through which said securing device passes.

8. An adjustable supporting device for mirrors and the like, comprising holding means to which the mirror is secured, a pair of arms to which said holding means is pivoted at separated points to permit the mirror to swing in one plane, a pair of attaching members adapted to be secured to a support, each of said arms engaging its related attaching member, a pivotal connection between one of said arms and its attaching member, said other arm being movable on its related attaching member, and means for detachably securing said second arm in different positions and places on its attaching member to vary the distance between the ends of the mirror and said supporting members, whereby the mirror may be adjusted obliquely relatively to its support.

9. An adjustable supporting device for mirrors and the like, comprising holding means constructed to be secured to the mirror, attaching means having provision for attachment to a support, said securing means and attaching means being rigid respectively with the mirror and said support, a pair of rigid arms pivoted directly to said holding means at separated points to permit the mirror to be adjusted angularly in a plane at an angle to the face of the mirror, and means for adjustably but rigidly securing said rigid arms directly to said attaching means to permit the mirror to be adjusted obliquely to said support in a plane at an angle to said first mentioned plane of adjustment, whereby the mirror can be set both obliquely and at an inclination to the support, and means for rigidly securing the parts in adjusted positions.

Witness my hand this 22nd day of July, 1920.

JOHN R. OISHEI.

Witnesses:
 VALENTINE O'GRADY,
 H. F. WIRTH.

It is hereby certified that in Letters Patent No. 1,394,440, granted October 18, 1921, upon the application of John R. Oishei, of Buffalo, New York, for an improvement in "Adjustable Supports or Brackets," an error appears in the printed specification requiring correction as follows: Page 3, line 32, claim 3, for the word "bars" read *lugs;* and that the said Letters Patent should be read with this correction therein that the same may conform to the record of the case in the Patent Office.

Signed and sealed this 22d day of November, A. D., 1921.

[SEAL.]

WM. A. KINNAN,
*Acting Commissioner of Patents.*